United States Patent
Lo

(10) Patent No.: US 10,242,311 B2
(45) Date of Patent: Mar. 26, 2019

(54) ZERO COEFFICIENT SKIPPING CONVOLUTION NEURAL NETWORK ENGINE

(71) Applicant: Vivante Corporation, San Jose, CA (US)

(72) Inventor: Mankit Lo, Fremont, CA (US)

(73) Assignee: VIVANTE CORPORATION, San Jose, CA (US)

( * ) Notice: Subject to any disclaimer, the term of this patent is extended or adjusted under 35 U.S.C. 154(b) by 0 days.

(21) Appl. No.: 15/671,860

(22) Filed: Aug. 8, 2017

(65) Prior Publication Data
US 2018/0046437 A1 Feb. 15, 2018

Related U.S. Application Data

(60) Provisional application No. 62/373,518, filed on Aug. 11, 2016.

(51) Int. Cl.
*G09G 5/00* (2006.01)
*G06N 3/04* (2006.01)
(Continued)

(52) U.S. Cl.
CPC .............. *G06N 3/04* (2013.01); *G06F 7/5443* (2013.01); *G06F 7/764* (2013.01); *G06F 17/153* (2013.01);
(Continued)

(58) Field of Classification Search
CPC ........ G06N 3/0454; G06N 3/063; G06N 3/10; G06F 15/8046; G06F 17/153;
(Continued)

(56) References Cited

U.S. PATENT DOCUMENTS

| 9,805,303 B2* | 10/2017 | Ross | G06N 3/063 |
| 2014/0337262 A1* | 11/2014 | Kato | G06F 17/15 |
| | | | 706/26 |
| 2016/0379073 A1 | 12/2016 | Pan | |

FOREIGN PATENT DOCUMENTS

EP 2958048 12/2015

OTHER PUBLICATIONS

Rahman Atul et al. Efficient FPGA Acceleration of Convolutional Neural Networks Using Logical 3D Compute Array. 2016 Design, Automation & Test in Europe Conference & Exhibition. EDAA, Mar. 14, 2016 (Mar. 14, 2016), pp. 1393-1398.
(Continued)

*Primary Examiner* — Hau H Nguyen
(74) *Attorney, Agent, or Firm* — David R. Stevens; Stevens Law Group

(57) ABSTRACT

A convolution engine, such as a convolution neural network, operates efficiently with respect to sparse kernels by implementing zero skipping. An input tile is loaded and accumulated sums are calculated for the input tile for non-zero coefficients by shifting the tile according to a row and column index of the coefficient in the kernel. Each coefficient is applied individually to tile and the result written to an accumulation buffer before moving to the next non-zero coefficient. A 3D or 4D convolution may be implemented in this manner with separate regions of the accumulation buffer storing accumulated sums for different indexes along one dimension. Images are completely processed and results for each image are stored in the accumulation buffer before moving to the next image.

20 Claims, 5 Drawing Sheets

(51) Int. Cl.
*G06F 17/16* (2006.01)
*H04N 19/132* (2014.01)
*G06F 7/76* (2006.01)
*G06F 17/15* (2006.01)
*G06F 7/544* (2006.01)
*H04N 19/42* (2014.01)

(52) U.S. Cl.
CPC .......... *G06F 17/16* (2013.01); *H04N 19/132* (2014.11); *H04N 19/42* (2014.11); *G06F 2207/4824* (2013.01)

(58) Field of Classification Search
CPC ............. G06F 17/16; G06F 2207/4824; G06F 7/5443; G06T 1/60
See application file for complete search history.

(56) References Cited

OTHER PUBLICATIONS

Han Song et al. EIE: Efficient Inference Engine on Compressed Deep Neural Network. 2013 21st International Conference on Program Comprehension (ICPC); [International Symposium on Computer Architecture.(ISCA)], IEEE, US, Jun. 18, 2016 (Jun. 18, 2016), pp. 243-254.
Alex Krizhevsky et al. Imagenet Classification With Deep Convolutional Neural Networks. The 26th annual conference on Neural Information Processing Systems (NIPS'25): Dec. 3-8, 2012, Dec. 6, 2012.
Alex Krizhevsky. One Weird Trick for Parallelizing Convolutional Neural Networks. Apr. 23, 2014.

* cited by examiner

ZERO COEFFICIENT SKIPPING CONVOLUTION NEURAL NETWORK ENGINE

RELATED APPLICATIONS

This application claims the benefit of U.S. Provisional Application Ser. No. 62/373,518 entitled ZERO COEFFICIENT SKIPPING CONVOLUTION NEURAL NETWORK ENGINE and filed Aug. 11, 2016, which is hereby incorporated herein by reference in its entirety. This application is also related to U.S. application Ser. No. 15/671,829 filed Apr. 8, 2017, which is hereby incorporated herein by reference in its entirety.

BACKGROUND

Field of the Invention

This invention relates to systems and methods for performing matrix convolution, such as for use in implementing a convolution neural network.

Background of the Invention

Many machine learning applications using Convolutional Neural Networks (CNN) require very high computation and memory bandwidth. One way to reduce the requirement is to zero prune the coefficients and skip the computation when a coefficient is zero. These existing software and hardware optimization techniques are based on matrix multiplications. One example is the Sparse Matrix Multiplication technique described in *Sparse Convolutional Neural Networks* (Baoyuan Liu, Min Wang1, Hassan Foroosh1, Marshall Tappen, and Marianna Penksy) and *Deep Neural Network Model Compression and Efficient Inference Engine* (Song Han CVA group, Stanford University, both of which are incorporated herein by reference in their entirety.

The systems and methods disclosed herein provide an improved approach for implementing CNN.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
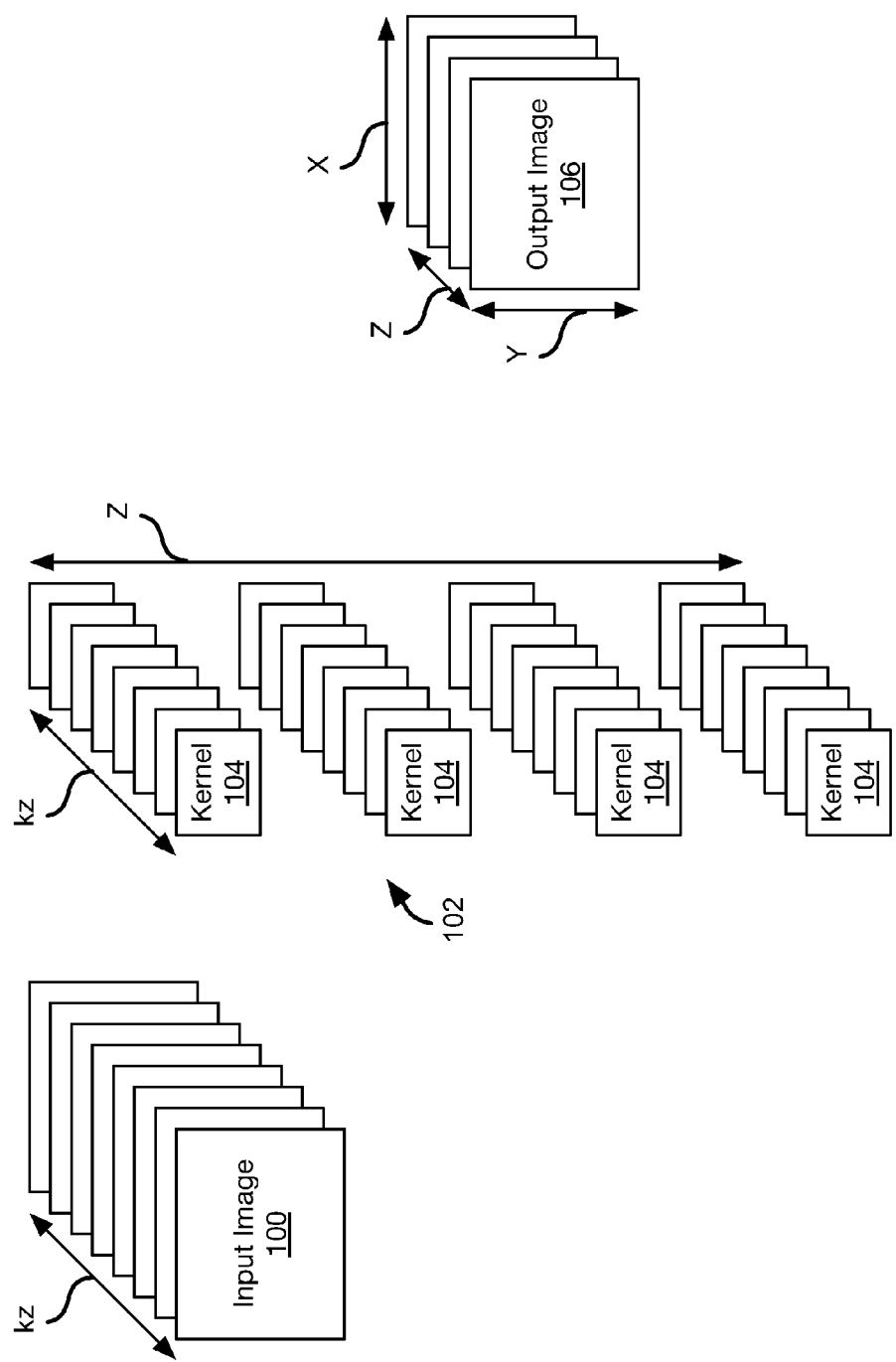
FIG. 1 is a schematic block diagram of data structures used and generated according to the methods described herein.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized, including non-transitory media. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Matrix multiplication based architecture has a fundamental problem of requiring duplication of the original 2D image data to form the input matrices. And, as a result, increases the already very high memory bandwidth requirement. Convolution based architecture for CNN exist, such as the approach described in *A 240 G-ops/s Mobile Coprocessor for Deep Neural Networks* by Vinayak Gokhale, Jonghoon Jin, Aysegul Dundar, Berin Martini and Eugenio Culurciello, which is hereby incorporated herein by reference.

Our solution combines zero coefficient skipping with a novel convolution engine. This dramatically lowers both computation and memory bandwidth. Traditional convolution is done by moving the whole kernel across the input 2D image to generate one result at a time. Our engine applies only one kernel coefficient to a big portion (tile) of the input 2D image each time. Since only one kernel coefficient is used at a time, multiplication by the zero coefficient is skipped to achieve much higher performance. If the kernel is compressed ahead of time, this further allows the use of a low-cost kernel decompressor which decompresses only one coefficient at a time.

In another aspect, convolution is performed using accumulation instead of summation. This also enables working on the third dimension of a CNN input as it naturally fits into part of an accumulation process. This further also allows convolutions from different kernels to be performed in an interleaved manner. This increases the reuse of the input image data similar to matrix multiplication.

Using a reasonable sized accumulation buffer, a multi-kernel accumulation convolutional neural network engine can perform convolutions across multiple kernels together. These convolutions from different kernels efficiently share the same 2D input image data to reduce input image data bandwidth. Furthermore, this same accumulation buffer allows convolution being done one coefficient at a time across all multipliers in the system, which allows streaming in of the coefficients one at a time without much buffering.

Referring to FIG. 1, the apparatus and methods disclosed herein for computing the convolution of a kernel with an array of values, such as pixel values of an image, may be used in the context of a CNN algorithm. In particular, three dimensional images may be input to the algorithm. For example, the input may be an array of images 100. Accordingly, each pixel of each image may represent a volume of a three-dimensional (3D) space, often referred to as a "voxel." In the illustrated embodiment, there are kz images, where kz is an integer greater than two, preferably greater than 8 or more. Each input image may therefore be referred to using an index along the kz dimension, i.e. I(kz).

The input images 100 may be processed by arrays 102 of kernels 104. In one application, each kernel 104 of an array 102 is applied to one input image to obtain an array of convolution outputs. In the illustrated embodiment, there are Z arrays 102 that each include kz kernels. Each kernel defines a ky and a kz dimension. Accordingly, each coefficient C is defined with respect to four indexes: C(kz, Z, kx, ky). A kernel K is used herein to refer to coefficients having the same index in the kz and Z dimensions, i.e. $K(kz_1, Z_1)=C(kz_1, Z_1, kx, ky)$. Accordingly each input image I(kz) is convolved with a corresponding kernel K(kz, Z) to obtain a convolution V(kz, Z). The convolutions V(kz, Z) with the same Z index are then summed to obtain an output image 106, i.e. O(Z).

The output images 106 have dimensions of X by Y values, where X and Y may be the same as or different from the original dimensions of the input image 100. Each kernel 104 may be a two dimensional array of values determined according to any approach to CNN algorithms known in the art.

The output images 106 may then be processed according to one or more functions, which may include application of additional arrays 102 of other kernels 104 in order to achieve a desired output according to any method known in the art.

The convolutions of images 100 with kernels 104 is advantageously performed using the components and methods described below with respect to FIGS. 2 and 3. In particular, for a given value of $kz=kz_1$, kernels $K(kz_1, Z)$, for all values of Z, must be applied to the same input image $I(kz_1)$. Therefore, each image $I(kz_1)$ is loaded only once (such as in a number of tiles that may overlap) and all kernels $K(kz_1, Z)$ are applied to it before the next image $I(kz \neq kz_1)$ is processed.

Figure 2:
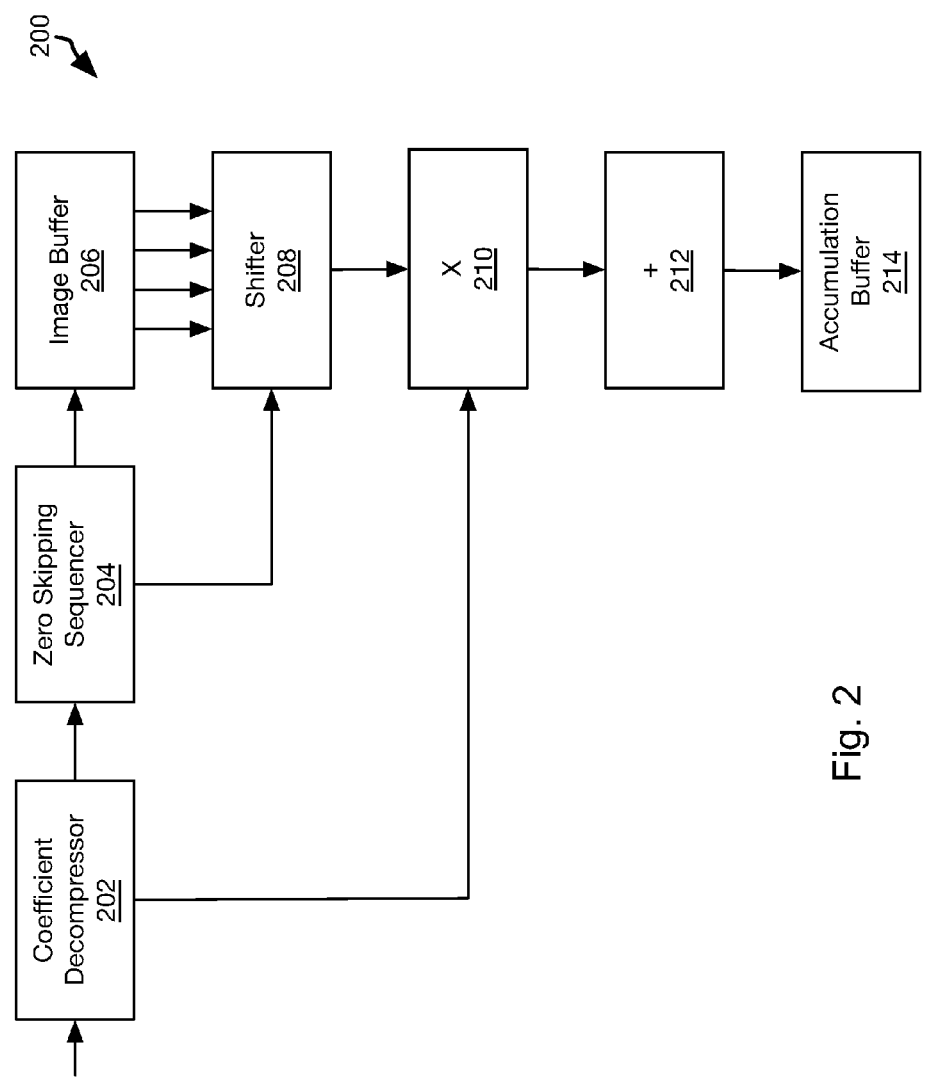
FIG. 2 is a schematic block diagram of components for computing convolution of a kernel with input data in accordance with an embodiment of the present invention.

Referring to FIG. 2, a graphics processing unit (GPU), arithmetic and logic unit (ALU), application specific integrated circuit (ASIC), field programmable gate array (FPGA), or a programmable general-purpose processor may implement the illustrated components or the functions of the illustrated components 200.

A group of kernels may be input to a coefficient decompressor 202. The kernels may be compressed such that the output of the decompression step is a set of entries, each including a coefficient C(kz, Z, kx, ky) and its location (e.g., kx, ky, kz and Z indexes). In this manner, where the kernel is sparse, the amount of data required to store the kernel is reduced.

The coefficient decompressor 202 may output a stream of entries starting at kernel $K(kz_1,0)$ in sequence, i.e. for each kernel, the entries will be streamed sequentially followed by sequentially streaming the entries of the next kernel $K(kz_1, 1)$, $K(kz_1, 2)$ until the entries of the last kernel $K(kz_1, Z-1)$ are streamed.

The stream of entries are sequentially processed by a zero skipping sequencer 204. The zero skipping sequencer 204 operates with respect to an image buffer 206. The image buffer 206 stores a portion of the image $I(kz_1)$. For example, the image $I(kz_1)$ may be divided into tiles. Each tile may include rows and columns corresponding to the row and column indexes (e.g., ky and kx indexes) of the kernels For a given entry including a coefficient C(kx,ky), a row index ky, and a column index kx, the tile stored in the image buffer 206 may be shifted vertically (rows shifted to different positions) by a number of rows equal to ky. The tile may also be shifted horizontally (columns shifted to different positions) by an amount equal to kx.

The vertical shift may be implemented by selecting a start address, e.g. row address, in the image buffer from which the tile will be read for input to subsequent stages of the components 200 such that the vertical shift is achieved. The horizontal shift may be accomplished by a shifter 208 that shifts the values in each row of the image buffer by a number of columns equal to the horizontal shifting amount. This shifting may be performed using any shifter implementation known in the art.

In some embodiments, the shifter 208 is a one, two, or four element segmented shifter. This segmented shifter can treat data in the image buffer 206 as 1 row×64 columns, 2 rows×32 columns, or 4 rows×16 columns. The segmented shifter performs horizontal shifts and vertical shifts according to this row and column definition. For example, if the data is arranged in one row, a vertical shift is done by just controlling the image buffer read address, i.e. the address from which data is read from the image buffer 206. If the data is in two or four rows, just controlling the image buffer read address is not enough. Instead, the read data may also need to be row shifted by putting the correct row at the correct position within the image buffer 206.

Note that the number of rows and columns of the convolution that are computed based on a tile are less than the size of the tile. For an M (row)×N (column) tile to which an A×B kernel is applied will yield an output tile with (M−A+1)×(N−B+1) convolution values. Accordingly, the vertical shift and the horizontal shift have the effect of positioning a (M−A+1)×(N−B+1) window on the tile in the image buffer 206, with the values within that window being output for further processing by a multiplier 210 and adder 212. The multiplier 210 and adder 212 may process (M−A−1)×(N−B−1) values in parallel.

Inasmuch as the number of valid convolution values output is less than the size of the tile, the tiles may be processed such that one output tile is generated at a time. Specifically, for each output tile having $M_2$ rows and $N_2$ columns, the input tile loaded will include $M=M_2+A-1$ rows and $N=N_2+B-1$ columns. Each tile is loaded such that it produces a particular output tile in the output image 106.

Since each output tile requires more input rows and columns than it includes, the input tiles will overlap one another, i.e. include some of the same rows and/or columns. For example, an initial tile may have rows 0 through M−1 and columns 0 through N−1 of an input image 100. A second tile may have rows 0 through M−1 and columns N−B−1 through 2*N−B−1 of an input image. Likewise, after all the tiles in rows 0 through M−1 are processed, a next row of tiles may include rows M−A−1 through 2*M−A−1 and columns 2*N−B−1.

Stated generally, moving horizontally, each tile will include the last B−1 columns of a preceding tile. Moving vertically, each tile will include the last A−1 rows of a preceding tile.

The coefficient and the tile as shifted according to the indexes of the coefficient are then input to a multiplier 210. The multiplier 210 may implement a number of multipliers at least as large as one row of the output tile such that updates to each row of the output tile may be performed in parallel.

The output of the multiplier 210 is then input to an adder 212 that takes as its input an array of elements stored in an accumulation buffer 214. The results of the addition are then stored back into the accumulation buffer 214. In the illustrated embodiment, 56 values of the tile, as shifted, are multiplied by the coefficient and added to corresponding 56 values stored in the accumulation buffer 214 and written back to the accumulation buffer 214.

In particular for a given tile value T(i,j), with i and j being a row and column location, a value A(i,j) in the accumulation buffer 214 may be set equal to A(i,j)=A(i,j)+T(i,j). Note that A(i,j) may be replaced with A(i+$i_0$, j), where $i_0$ is an offset within the accumulation buffer 214. In some embodiments, the size of the tile may be set to be equal to, or nearly equal (e.g. 90% of), the size of the accumulation buffer 214. Alternatively, the accumulation buffer 214 may be many times larger than the size of a tile.

The horizontal and vertical shifting controlled by the zero skipping sequencer 204 ensures that the output of the multiplication step will be aligned with the proper position within the accumulation buffer 214. In this manner, after all the coefficients of a kernel are processed, the values of the accumulation buffer 214 will be equal to the convolution of the kernel with the input tile.

Figure 3A:
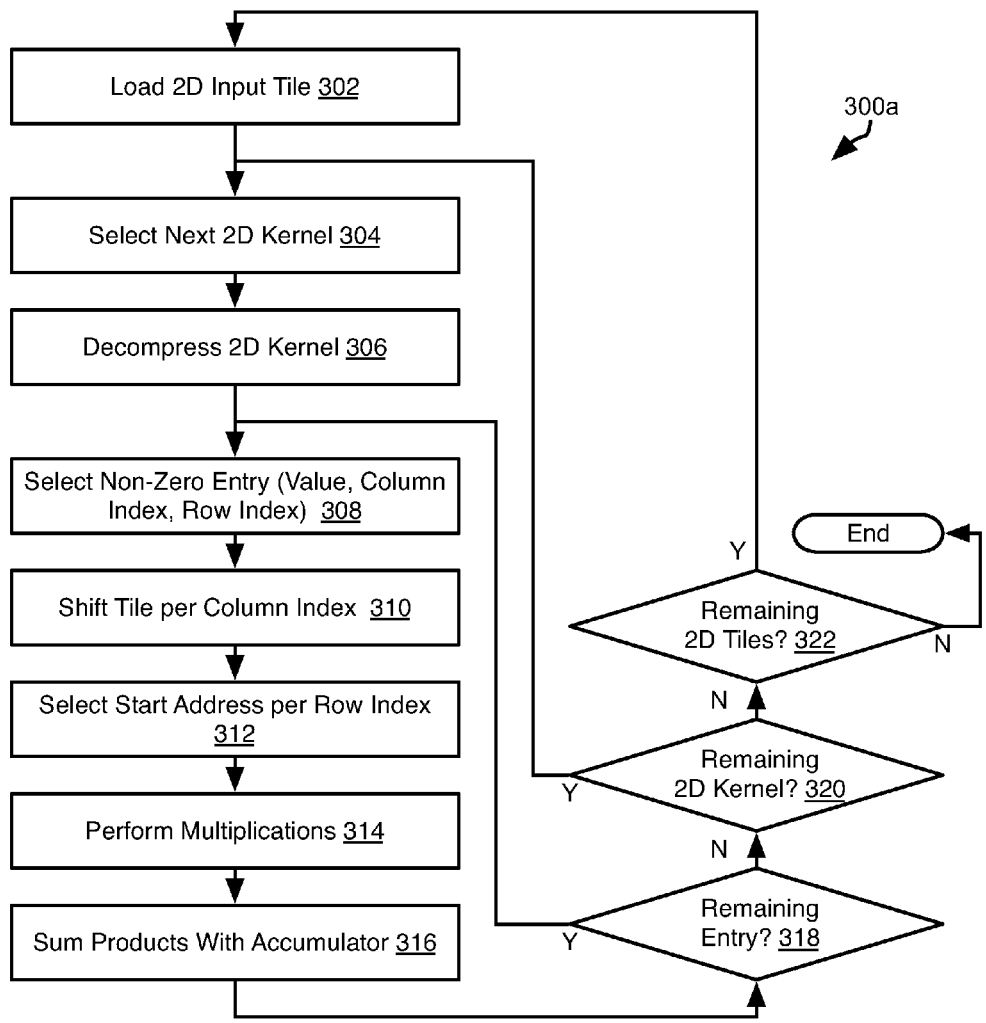
FIGS. 3A and 3B are process flow diagrams of methods for computing convolution of a kernel with input data in accordance with an embodiment of the present invention.

Referring to FIG. 3A, the illustrated components 200 or a general-purpose processor may implement the illustrated method 300a. In particular, interoperation and control of the sequence of steps of FIG. 3A using the illustrated components 200 may be performed by a controller. The method 300a may include loading 302 a 2D input tile ("the current tile") of an image being processed ("the current image") into the image buffer 206 and selecting a next 2D kernel 104, such as a 2D kernel 104 in an array 102. For the first iteration, the tile that is loaded 302 may be a first tile in the current image and the 2D kernel ("the current kernel") may be a first 2D kernel in a column of 2D kernels (see FIG. 1) corresponding to the current image, e.g. having the same kz index as the current image.

The current kernel is then decompressed 306, which results in a stream of entries, each including a coefficient, a column index, and a row index. Alternatively, a single index value may be output that maps to a specific column and row within the kernel. Note that the illustrated method 300a is particularly useful where many of the entries of the kernel are zero. Accordingly, only entries for non-zero values are included in the compressed kernel and therefore multiplication and addition steps describe below are omitted for these non-zero values.

The entries in the kernel may be processed in sequence. For example, the method 300a may include selecting 308 an entry in the stream ("the current entry"). A portion of the values (e.g. the (M−A+1)×(N−B+1) window) of the current tile may then be shifted 310 horizontally according to the column index of the current entry and shifted 312 vertically according to the row index of the current entry.

This may include reading a portion of the rows of the current tile from the image buffer 206 starting at the start address and horizontally shifting each row after it is read. For example, all N values in a row may be shifted to the left from 0 to B−1 positions, according to the value of the column index. Values to the left will be shifted out and a remaining N−B+1 values in each row starting from the left will be subsequently processed as "the shifted values" discussed below. The shifted values are then input to the multipliers 210, which multiplies 314 each value by the coefficient from the current entry. As noted above, the multiplication step 314 may be performed in parallel such that each value is input to a separate multiplier 210.

The outputs of the multiplication step 314 are then summed 316 with the current contents of the accumulation buffer 214. In particular, each position in the shifted tile may be added to a value at a corresponding position in the accumulation buffer 214 and written to that position. For example, a tile value T(i,j), where i and j are row and column positions within the tile, may be summed at step 316 as A(i,j)=A(i,j)+T(i,j), where A(I,j) is a value at position i and j within the accumulation buffer 314. Alternatively, A(i,j) may be replaced with A(i+$i_0$, j), where $i_0$ is an offset within the accumulation buffer.

Note that each array 102 (e.g., row) of kernels 104 is used to determine one output image 106. The accumulation buffer will therefore include a separate set of values for each kernel in a column. Accordingly, for a given kernel K(kz,Z) as the current kernel, an offset $i_0$=Z*(M−A+1) may be used to determine the addresses in the accumulation buffer 214 from which to obtain values used in the summing step 316 and to which the result of the summing step 316 will be written.

If entries in the current kernel are found 318 to be remaining, then processing continues at step 308 with the next entry in the current kernel as the current entry. If no entries are found to remain in the current kernel, then the method 300 may include evaluating 320 whether kernels remain in the column corresponding to the current image. If kernels in the column remain to be processed, processing continues at step 304 with the next kernel in the column as the current kernel.

Note that in some embodiments, the kernels of a column are decompressed and output in a stream, such that discrete evaluations of steps 318 and 320 are not performed, but rather the end of the stream for a particular column is detected instead.

If all of the kernels in the column are determined 320 to be processed, then the method 300 may include evaluating 322 whether there are remaining tiles of the current image that have not been processed. If so, then processing continues at step 302 with a next tile in the image as the current tile that is loaded at step 302. If not, then the method ends with respect to the current image.

Figure 3B:
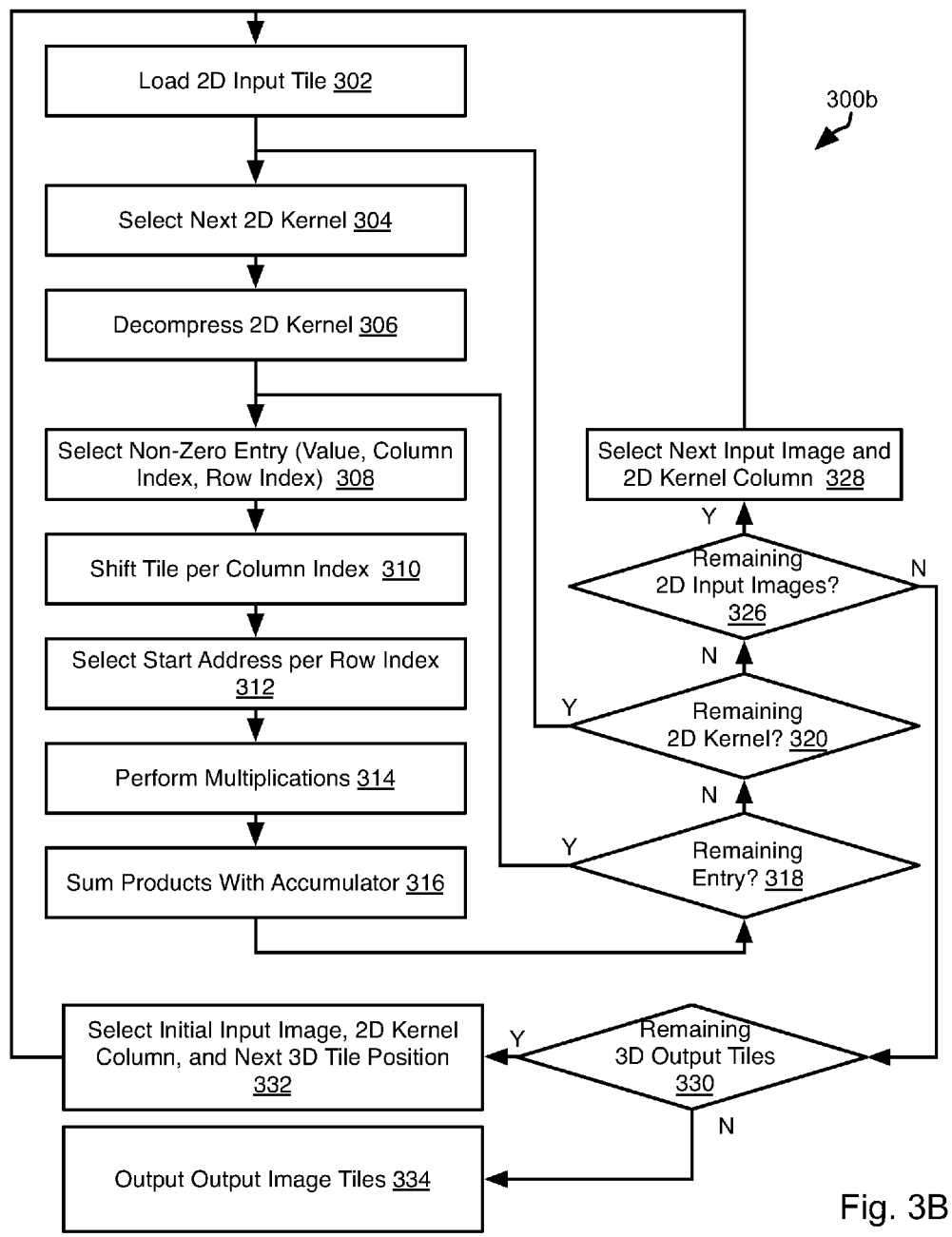

Referring to FIG. 3B, in some embodiments, the method 300*b* may be implemented by the components 200 in order to implement a 3D convolution. In this case, a set of input images 100 are processed to obtain a single output image 106 using an array 102 of kernels 104 and multiple arrays 102 are used to obtain a set of output images 106.

In this case, if there are determined 320 to be no more 2D kernels to be processed with respect to the current tile, the method 300*b* includes determining 326 whether there are remaining 2D input images 100 to be processed. If so, a next 2D input image 100 is selected 328 as the current image and the column of 2D kernels corresponding to the current image are also selected for processing. Processing then continues at step 302 with respect to the current image.

If no remaining 2D input images are found 326 to be processed with respect to a current tile position, the method 300*b* includes evaluating 330 whether there are remaining tile positions that remain to be processed. If so, then at step 332 an initial image is selected as the current image, a column of kernels corresponding to the current image are selected for processing, and a next 3D tile position is selected as the current tile position. Processing then continues at step 302, with the tile being loaded 302 from the current tile position.

For the first iteration of the method 300*b*, the current tile position is a first tile position, e.g. an M×N tile starting at position m=0 and n=0. With each iteration, the tile position is moved horizontally or horizontally and vertically to all permutations of m and n, with m=0 to Th−1 and n=0 to Tw, where Th is the number of rows of tiles and Tw is the number of columns of tiles. As noted above, tiles may overlap such that the next tile position includes B−1 columns of a previous tile or A−1 rows of a previous row of tiles.

If no 3D tiles are found 330 to remain to be processed, the tiles stored in the accumulation buffer are output 334 and stored in the output images 106, e.g. in a persistent storage device or other memory device, at a position in the output image 106 corresponding to the current tile position. The output tiles stored in the accumulation buffer 214 after each tile position is completely processed (i.e., all columns of kernels applied) are final values of one tile for each output image 106. Step 334 may further include initializing the accumulation buffer 214 to zero.

Note that the above-described method may be part of application of a CNN algorithm. Accordingly, other processing of a CNN algorithm may precede and follow execution of the method 200. The above-described method may also be used in any other image processing technique where convolution is performed. The method 200 may also be used any time matrix convolution is needed, particularly where the kernel is large.

Figure 4:
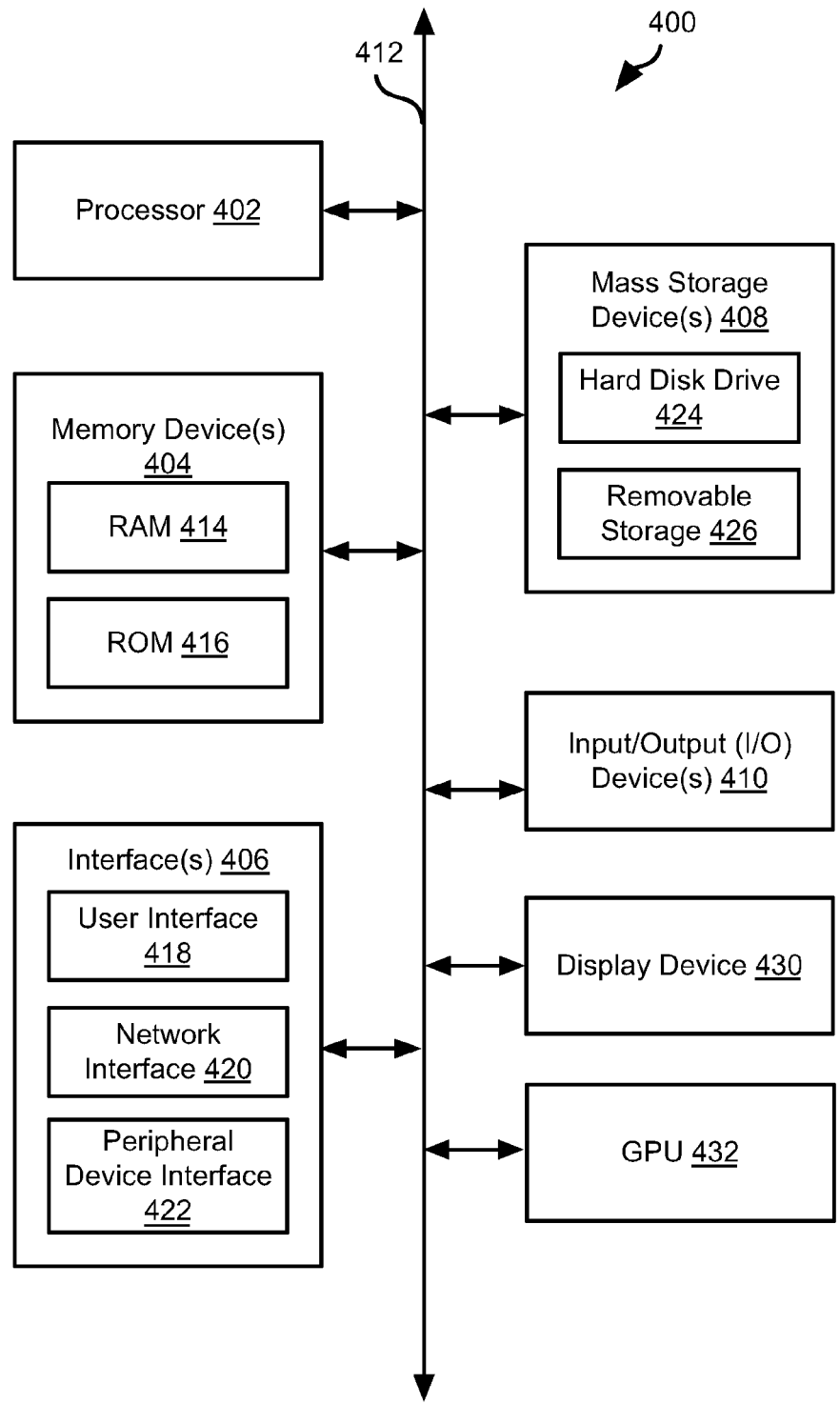
FIG. 4 is a diagram of a computing device in which the systems and methods disclosed herein may be implemented.

FIG. 4 is a block diagram illustrating an example computing device 400. Computing device 400 may be used to perform various procedures, such as those discussed herein. Computing device 400 can function as a server, a client, or any other computing entity. Computing device can incorporate a circuit performing the methods disclosed herein, and can execute one or more application programs, such as the application programs that invoke the methods disclosed herein to calculate trigonometric functions. Computing device 400 can be any of a wide variety of computing devices, such as a desktop computer, a notebook computer, a server computer, a handheld computer, tablet computer and the like.

Computing device 400 includes one or more processor(s) 402, one or more memory device(s) 404, one or more interface(s) 406, one or more mass storage device(s) 408, one or more Input/Output (I/O) device(s) 410, and a display device 430 all of which are coupled to a bus 412. Processor(s) 402 include one or more processors or controllers that execute instructions stored in memory device(s) 404 and/or mass storage device(s) 408. Processor(s) 402 may also include various types of computer-readable media, such as cache memory.

Memory device(s) 404 include various computer-readable media, such as volatile memory (e.g., random access memory (RAM) 414) and/or nonvolatile memory (e.g., read-only memory (ROM) 416). Memory device(s) 404 may also include rewritable ROM, such as Flash memory.

Mass storage device(s) 408 include various computer readable media, such as magnetic tapes, magnetic disks, optical disks, solid-state memory (e.g., Flash memory), and so forth. As shown in FIG. 4, a particular mass storage device is a hard disk drive 424. Various drives may also be included in mass storage device(s) 408 to enable reading from and/or writing to the various computer readable media. Mass storage device(s) 408 include removable media 426 and/or non-removable media.

I/O device(s) 410 include various devices that allow data and/or other information to be input to or retrieved from computing device 400. Example I/O device(s) 410 include cursor control devices, keyboards, keypads, microphones, monitors or other display devices, speakers, printers, network interface cards, modems, lenses, CCDs or other image capture devices, and the like.

Display device 430 includes any type of device capable of displaying information to one or more users of computing device 400. Examples of display device 430 include a monitor, display terminal, video projection device, and the like.

A graphics-processing unit (GPU) 432 may be coupled to the processor(s) 402 and/or to the display device 430. The GPU may be operable to render computer generated images and perform other graphical processing. The GPU may include some or all of the functionality of a general-purpose processor, such as the processor(s) 402. The GPU may also include additional functionality specific to graphics processing. The GPU may include hard-coded and/or hard-wired graphics function related to coordinate transformation, shading, texturing, rasterization, and other functions helpful in rendering a computer generated image.

Interface(s) 406 include various interfaces that allow computing device 400 to interact with other systems, devices, or computing environments. Example interface(s) 406 include any number of different network interfaces 420, such as interfaces to local area networks (LANs), wide area networks (WANs), wireless networks, and the Internet. Other interface(s) include user interface 418 and peripheral device interface 422. The interface(s) 406 may also include one or more user interface elements 418. The interface(s) 406 may also include one or more peripheral interfaces such as interfaces for printers, pointing devices (mice, track pad, etc.), keyboards, and the like.

Bus 412 allows processor(s) 402, memory device(s) 404, interface(s) 406, mass storage device(s) 408, and I/O device(s) 410 to communicate with one another, as well as other devices or components coupled to bus 412. Bus 412 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 400, and are executed by processor(s) 402. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What are claimed are listed below:

1. A method for performing convolution, the method comprising:
    providing an array of coefficients C(kz, Z, kx, ky) defining a Z dimension, a kz dimension, a kx dimension, and a ky dimension;
    providing a plurality of input images each corresponding to an index in the kz dimension;
    (a) selecting, by an electronic device, a next tile position of a plurality of tile positions as the current tile position;
    (b) selecting, by an electronic device, a next input image I(kz1) of the plurality of input images as the current image and an index kz1 corresponding to the current image as a current kz index;
    (c) loading, by the electronic device, a tile of the current image I(kz1) at the current tile position into a buffer as the current tile;
    (d) individually and sequentially performing, by the electronic device, for each coefficient of at least a portion of coefficients C(kz1, Z, kx, ky) of the array of coefficients having an index in the kz dimension equal to kz1:
        setting a ky shift amount of the current tile according to a ky index of the each coefficient in the ky dimension;
        setting a kx shift amount of the current tile according to a kx index of the each coefficient in the kx dimension;
        applying the ky shift amount to the tile and applying the kx shift amount to the current tile in the buffer to obtain a shifted tile;
        multiplying the shifted tile by the each coefficient such that each row of the shifted tile is multiplied by the each coefficient in parallel by a series of multipliers to obtain a set of products;
        adding the set of products to set of accumulated sums stored in an accumulation buffer to obtain a set of updated sums; and
        overwriting the set of accumulated sums with the set of updated sums;
    (e) performing (b) through (d) until all input images of the plurality of images have been processed according to (b) through (d);
    (f) outputting current values of the accumulated sums as an output image;
    (g) performing (a) through (f) until all tile positions of the plurality of tile positions has been processed according to (a) through (f);
    wherein the ky shift amount and kx shift amount are selected such that the accumulated sums are a three dimensional convolution of the current tile with the plurality of images upon completion of (f).

2. The method of claim 1, wherein performing (d) is performed without ever overwriting or reloading the current tile in the buffer.

3. The method of claim 1, wherein the at least the portion of the coefficients of the array of coefficients having the current kz index comprises only non-zero coefficients of the coefficients of the array of coefficients having the current kz index.

4. The method of claim 1, wherein (d) further comprises decompressing a plurality of kernels each including coefficients of the array of coefficients having the current kz index and a unique index in the Z dimension.

5. The method of claim 4, wherein decompressing each kernel of the plurality of kernels comprises obtaining a set of entries, each entry including one coefficient of the each kernel, the kx index and the ky index of the one coefficient.

6. The method of claim 5, wherein the set of entries do not include entries for coefficients of the array of coefficients that are equal to zero.

7. The method of claim 1, wherein applying the ky and kx shift amounts to the current tile to obtain a shifted tile comprises:
    selecting a start address in the buffer according to the ky shift amount;
    reading image data from the buffer starting at the start address;
    shifting the image data according to the kx shift amount within the buffer to obtain the shifted data.

8. The method of claim 1, wherein multiplying the shifted tile by the each coefficient to obtain the set of products comprises multiplying each row of the shifted portion by the each coefficient simultaneously using an array of multipliers.

9. The method of claim 1, wherein the array of coefficients defines a convolution neural network (CNN).

10. The method of claim 1, wherein the accumulated sums include a plurality of sets of accumulated sums each corresponding to a different Z index along the Z dimension;
wherein adding the set of products to the set of accumulated sums stored in the accumulation buffer to obtain the set of updated sums and overwriting the set of accumulated sums with the set of updated sums comprises:
adding the set of products to a set of accumulated sums of the plurality of accumulated sums corresponding to a Z index of the each coefficient to obtain a set of updated sums; and
overwriting the set of accumulated sums of the plurality of accumulated sums corresponding to the Z index of the each coefficient with the set of updated sums.

11. An apparatus for performing convolution, the apparatus comprising an electronic device programmed to:
receive an array of coefficients C(kz, Z, kx, ky) defining a Z dimension, a kz dimension, a kx dimension, and a ky dimension;
receive a plurality of input images each corresponding to an index in the kz dimension;
(a) select a next tile position of a plurality of tile positions as the current tile position;
(b) select a next input image I(kz1) of the plurality of input images as the current image and an index kz1 corresponding to the current image as a current kz index;
(c) load a tile of the current image I(kz1) at the current tile position into a buffer as the current tile;
(d) individually and sequentially perform, for each coefficient of at least a portion of coefficients C(kz1, Z, kx, ky) of the array of coefficients having an index in the kz dimension equal to kz1:
setting a ky shift amount of the current tile according to a ky index of the each coefficient in the ky dimension;
setting a kx shift amount of the current tile according to a kx index of the each coefficient in the kx dimension;
applying the ky to the current tile and applying the kx shift amounts to the current tile within the buffer to obtain a shifted tile;
multiplying the shifted tile by the each coefficient to obtain a set of products;
adding the set of products to set of accumulated sums stored in an accumulation buffer to obtain a set of updated sums; and
overwriting the set of accumulated sums with the set of updated sums;
(e) perform (b) through (d) until all input images of the plurality of images have been processed according to (b) through (d);
(f) output current values of the accumulated sums as an output image;
(g) perform (a) through (f) until all tile positions of the plurality of tile positions has been processed according to (a) through (f);
wherein the ky shift amount and kx shift amount are selected such that the accumulated sums are a three dimensional convolution of the current tile with the plurality of images upon completion of (f).

12. The apparatus of claim 11, wherein the electronic device is programmed to perform (d) without ever overwriting or reloading the current tile in the buffer.

13. The apparatus of claim 11, wherein the at least the portion of the coefficients of the array of coefficients having the current kz index comprises only non-zero coefficients of the coefficients of the array of coefficients having the current kz index.

14. The apparatus of claim 11, wherein the electronic device is further programmed to perform (d) by decompressing a plurality of kernels each including coefficients of the array of coefficients having the current kz index and a unique index in the Z dimension.

15. The apparatus of claim 14, wherein the electronic device is further programmed to decompress each kernel of the plurality of kernels by obtaining a set of entries, each entry including one coefficient of the each kernel, the kx index and the ky index of the one coefficient.

16. The apparatus of claim 15, wherein the set of entries do not include entries for coefficients of the array of coefficients that are equal to zero.

17. The apparatus of claim 11, wherein the electronic device is further programmed to apply the ky and kx shift amounts to the current tile to obtain a shifted tile by:
selecting a start address in the buffer according to the ky shift amount;
reading image data from the buffer starting at the start address;
shifting the image data within the buffer according to the kx shift amount to obtain the shifted data.

18. The apparatus of claim 11, wherein the electronic device is further programmed to multiply the shifted tile by the each coefficient to obtain the set of products by multiplying each row of the shifted portion by the each coefficient simultaneously using an array of multipliers.

19. The apparatus of claim 11, wherein the array of coefficients defines a convolution neural network (CNN).

20. The apparatus of claim 11, wherein the accumulated sums include a plurality of sets of accumulated sums each corresponding to a different Z index along the Z dimension;
wherein the electronic device is further programmed to add the set of products to the set of accumulated sums stored in the accumulation buffer to obtain the set of updated sums and overwriting the set of accumulated sums with the set of updated sums by:
adding the set of products to a set of accumulated sums of the plurality of accumulated sums corresponding to a Z index of the each coefficient to obtain a set of updated sums; and
overwriting the set of accumulated sums of the plurality of accumulated sums corresponding to the Z index of the each coefficient with the set of updated sums.

* * * * *